Figure 1:
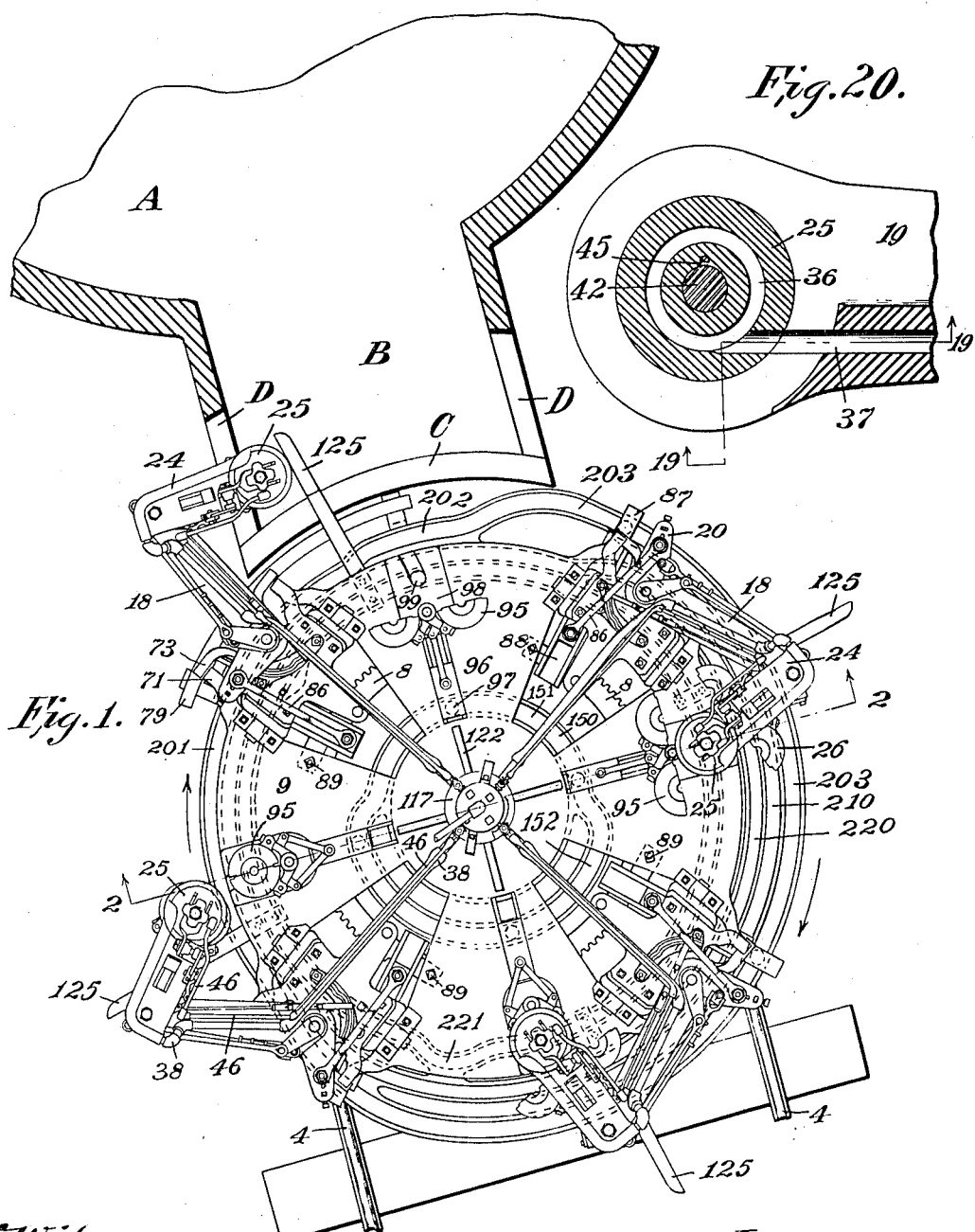

A. S. REICHEL.
MACHINE FOR MANUFACTURING GLASSWARE.
APPLICATION FILED APR. 13, 1911.

1,020,222.

Patented Mar. 12, 1912.

6 SHEETS—SHEET 1.

A. S. REICHEL.
MACHINE FOR MANUFACTURING GLASSWARE.
APPLICATION FILED APR. 13, 1911.

1,020,222.

Patented Mar. 12, 1912.
6 SHEETS—SHEET 2.

Witnesses;
Inventor
A. S. Reichel

A. S. REICHEL.
MACHINE FOR MANUFACTURING GLASSWARE.
APPLICATION FILED APR. 13, 1911.
1,020,222.
Patented Mar. 12, 1912.
6 SHEETS—SHEET 3.
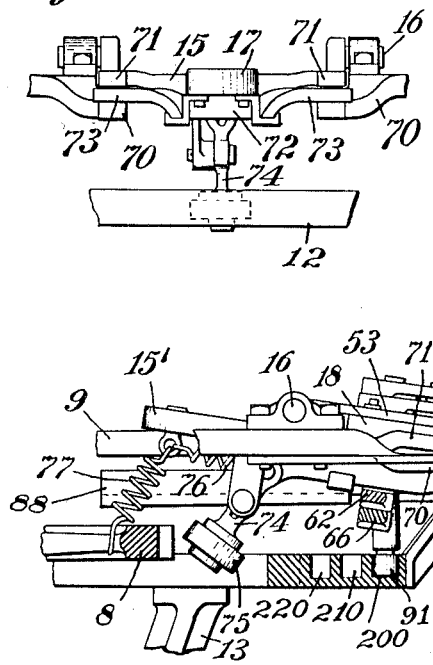
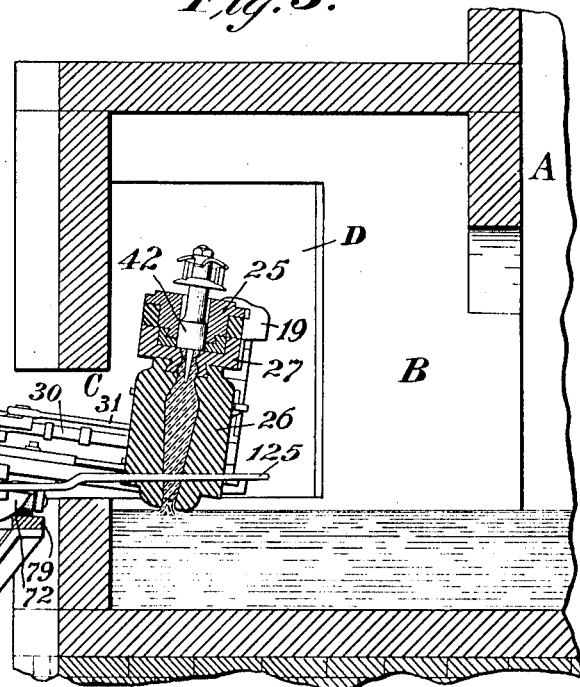
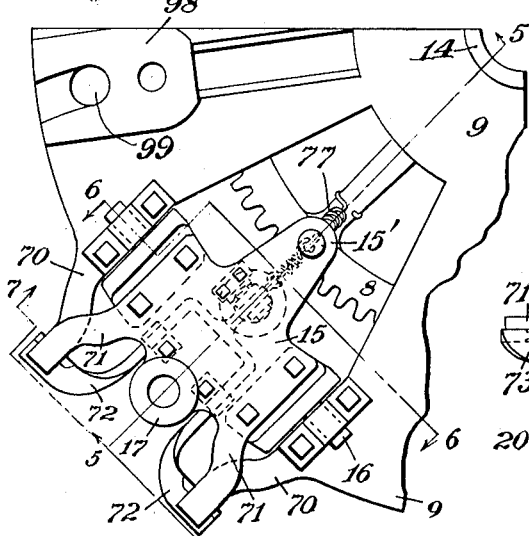
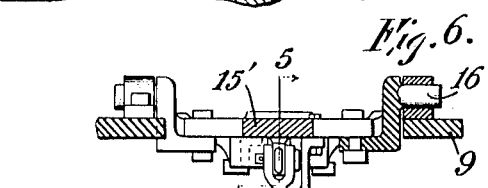
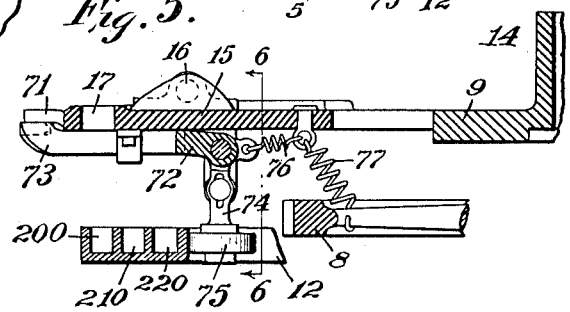

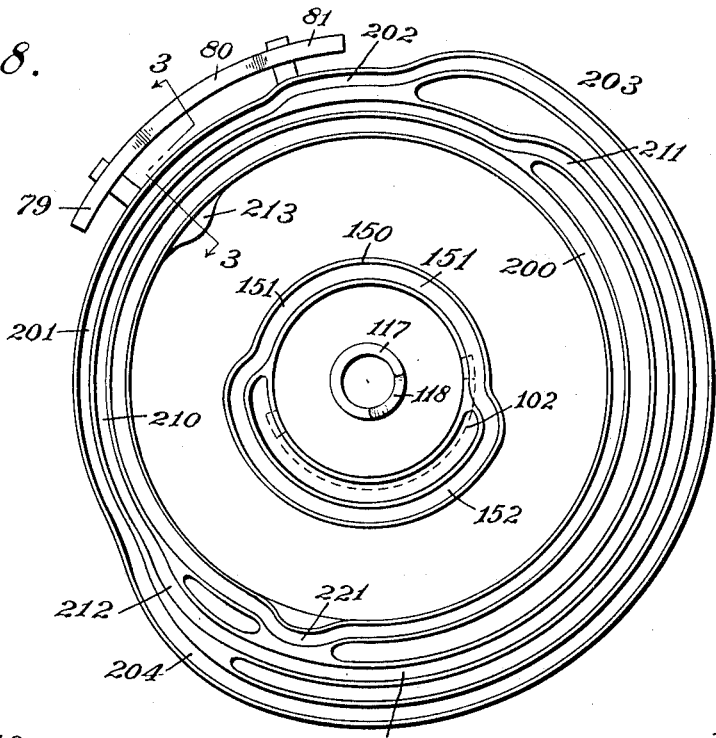
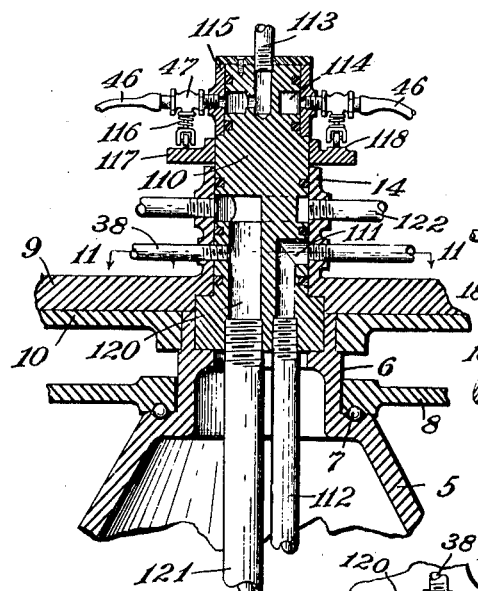
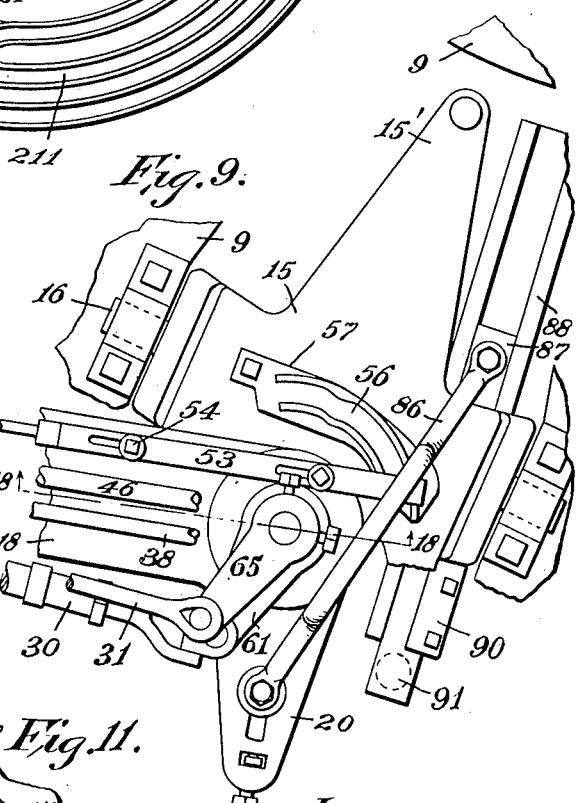

A. S. REICHEL.
MACHINE FOR MANUFACTURING GLASSWARE.
APPLICATION FILED APR. 13, 1911.
1,020,222.
Patented Mar. 12, 1912.
6 SHEETS—SHEET 5.
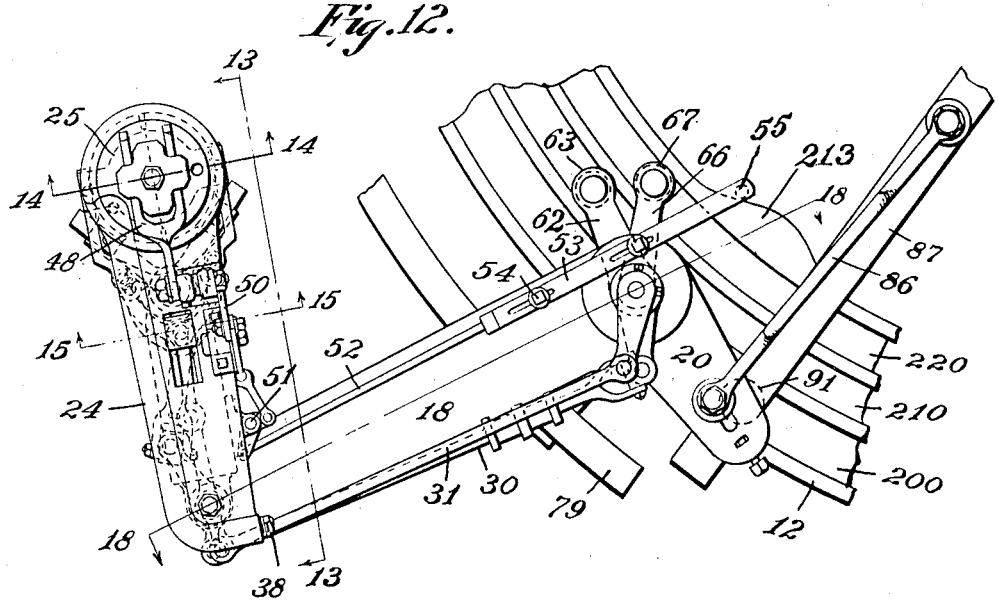
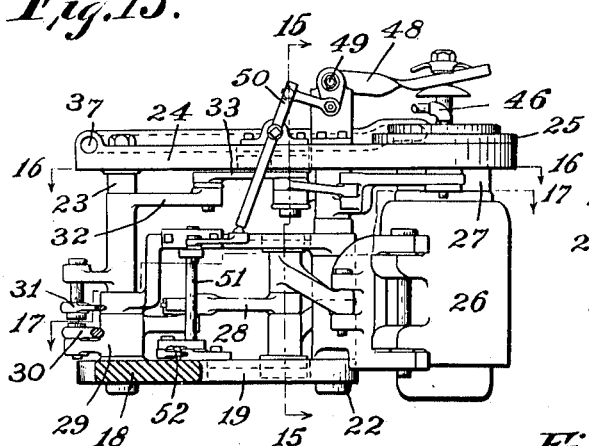
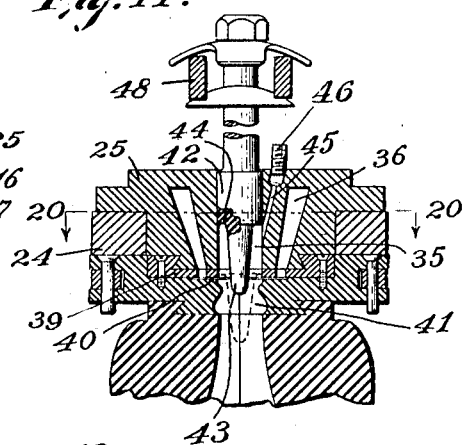
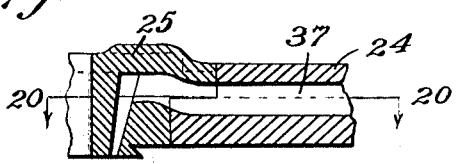
Witnesses:
Inventor
A. S. Reichel A. S. REICHEL.
MACHINE FOR MANUFACTURING GLASSWARE.
APPLICATION FILED APR. 13, 1911.
1,020,222.
Patented Mar. 12, 1912.
6 SHEETS—SHEET 6.
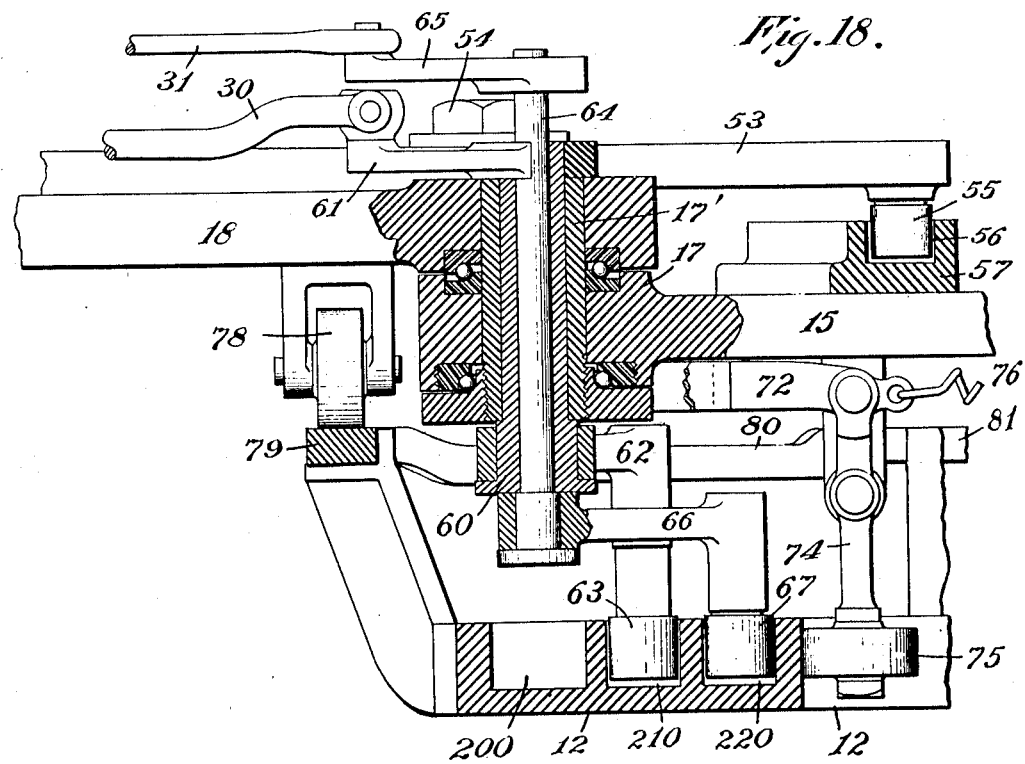
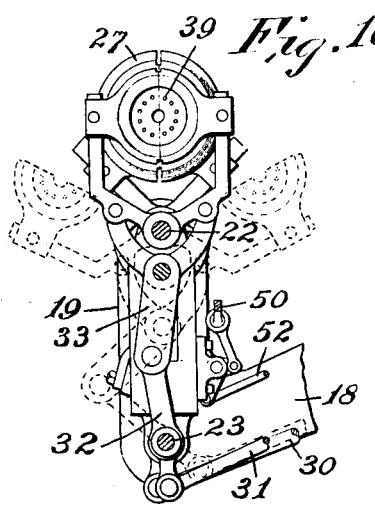
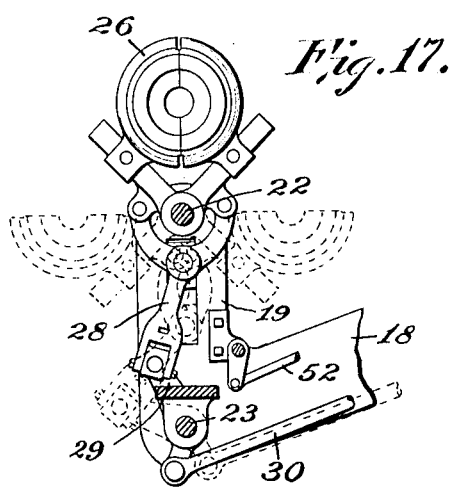
Witnesses;
Inventor
A. S. Reichel

UNITED STATES PATENT OFFICE.

ALVIN S. REICHEL, OF POINT MARION, PENNSYLVANIA, ASSIGNOR OF ONE-HALF TO POINT MARION MACHINE & MANUFACTURING COMPANY, OF POINT MARION, PENNSYLVANIA, A CORPORATION OF PENNSYLVANIA.

MACHINE FOR MANUFACTURING GLASSWARE.

1,020,222.      Specification of Letters Patent.      Patented Mar. 12, 1912.

Application filed April 13, 1911. Serial No. 620,873.

*To all whom it may concern:*

Be it known that I, ALVIN S. REICHEL, a resident of Point Marion, in the county of Fayette and State of Pennsylvania, have invented certain new and useful Improvements in Machines for Manufacturing Glassware, of which the following is a specification.

This invention relates to that class of machines wherein the article is partially formed by a pressing operation and completed by a blowing operation, and has reference particularly to the manufacture of narrow neck bottles.

The general object of the invention is to provide a machine wherein several complete sets of article-forming mechanisms are brought into operation successively, the mechanisms being mounted on rotatable supporting means, and their operations effected by suitably arranged fixed devices with which the moving parts are brought into contact.

A further object is to provide for the automatic filling of the blank or preliminary molds by passing them in close proximity to the surface of molten glass, whereby upon exhausting the air from the mold the glass is sucked thereinto. The continuing advancing movement of the supporting means operates to turn the blank mold into operative relation with the forming mechanism, to which latter the glass is duly delivered and released. In this movement of the blank mold it is caused to pass over a cutter which severs the glass hanging therefrom so that there will be no glass outside of the mold to obstruct the operating parts.

In connection with the foregoing, the invention contemplates the use of the machine in connection with a glass-melting pot or other suitable furnace having a passageway in the path of the extended blank mold, so that the latter may be moved uninterruptedly into and out of the furnace as the supporting means advances, the suction mechanism operating to fill the mold during its transit through the furnace, and the cutting mechanism severing the glass hanging therefrom so that the severed glass will drop back into the batch.

A further object is to provide for dipping the blank mold to position for filling as it advances through the furnace, the mold support being in the present embodiment mounted to oscillate on the carrier with such movement controlled by fixed devices past which the carrier moves.

The invention also includes mechanism of novel design for operating various parts of the machine; also for manipulating the mold charging suction, and the blank blowing air.

Figure 2:
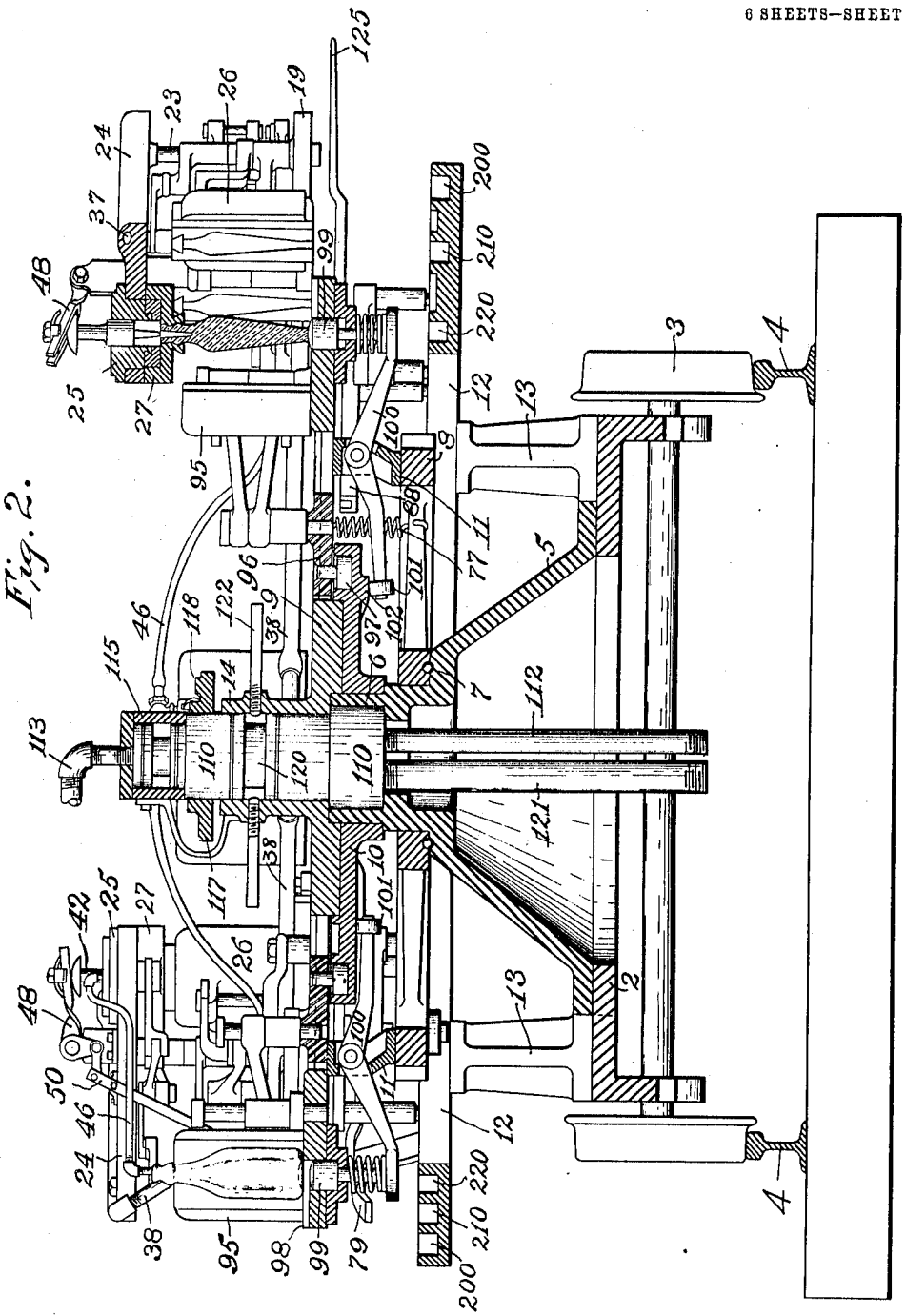

In the accompanying drawings, Figure 1 is a view in top plan of the machine shown in operative relation to a glass furnace, the latter being constructed with special reference to the automatic filling or charging of the blank molds. Fig. 2 is a vertical cross section of the machine on line 2—2 of Fig. 1. Fig. 3 is a view partly in elevation and partly in section, showing the positions of the several parts when the blank mold is charging or filling, the fixed operating parts being shown in section on line 3—3 of Fig. 8. Fig. 4 is a top plan of a portion of the rotatable carrier illustrating the vertically oscillating support for the mold-carrying arm. Fig. 5 is a vertical section on lines 5—5 of Figs. 4 and 6. Fig. 6 is a cross section on lines 6—6 of Figs. 4 and 5. Fig. 7 is an elevation of the oscillating support and latch mechanism, viewed on line 7—7 of Fig. 4. Fig. 8 is a top plan of the fixed cams which actuate the several operating mechanisms. Fig. 9 is a top plan of the oscillating mold support together with a number of its operating connections. Fig. 10 is a vertical section of the central or hub part carrying the air and suction connections, and Fig. 11 is a sectional plan on line 11—11 of Fig. 10. Fig. 12 is a top plan of the oscillating arm for supporting the blank forming mechanism, and Fig. 13 is a view of the same partly in elevation and partly in section on line 13—13 of Fig. 12. Figs. 14 and 15 are cross-sections on lines 14—14 and 15—15, respectively, of Fig. 12, the plane of section of Fig. 15 also being indicated by line 15—15 of Fig. 13. Fig. 16 is a sectional plan on line 16—16 of Fig. 13, illustrating the neck mold closed in full lines and open in dotted lines, and Fig. 17 similarly illustrates the blank mold, the same being taken on line 17—17 of Fig. 13. Fig. 18 is a view partly in section of the mechanism shown in Fig. 9, a portion of the section being taken on line 18—18 of Figs. 9 and 12. Fig. 19 is a longitudinal section of a portion of the ported arm which supports the blank mold, taken on line 19—19 of Fig. 20, and Fig. 20 is a sectional plan of the same part, taken on line 20—20 of Figs. 14 and 19.

Referring to the drawings, the entire machine is erected on a base frame 2 which is preferably mounted on wheels 3 for conveniently moving the apparatus on tracks 4 relatively to glass tank A. The latter is constructed with boot B, formed with the horizontal passageway C for the blank mold when filling, the passageway being enlarged at its ends at D, all as fully shown in Figs. 1 and 3.

The underframing of the machine, clearly shown in Figs. 2 and 10, consists primarily of a dome-like part 5 from which rises the hollow post or column 6, the latter shouldered to provide bearing 7 for the large gear wheel 8 to which driving mechanism, not shown, may be geared for propelling the horizontally rotatable main carrier or table 9, the table bearing on the cam plate 10 secured to post 6, and being connected to gear 8 by posts 11, Fig. 2. The large ring-like plate 12 is supported in fixed position beneath carrier 9 by posts 13 rising from frame 2, the surface of this plate being formed with cam grooves for operating the several mold and other actuating mechanisms as the latter are moved relatively thereto by carrier 9, all as will presently appear.

Carrier 9 is here shown equipped with four complete sets of bottle-forming apparatus, each operating independently, and it will be understood that this number may be either increased or diminished without departing from the invention. Each apparatus consists of blank forming mechanism which is mounted on carrier 9 to move vertically and horizontally relatively thereto, also blank blowing mechanism which includes a blow mold also mounted on the carrier, and to which the blank is delivered by the horizontal movement of the forming mechanism.

The blank forming mechanism consists essentially of mold supporting means capable of vertical and horizontal movements as described, the vertical movement being for lowering and raising the blank mold relatively to the molten glass in the furnace, and the horizontal movement for delivering the blank to the blowing mechanism. The mechanism mounted on this movable support is here shown consisting of coöperating blank and neck molds and suction means, together with means for opening and closing the molds at different periods in the operation of the machine.

Coming now to a description of the blank forming mechanism, a cradle-like support 15 is mounted to oscillate vertically on carrier 9 near its periphery, being supported by horizontal trunnions 16. The support is formed with vertical bearing 17, Figs. 4 and 18, on which is mounted the horizontally movable arm 18 carrying at its outer end the substantially right angle extension 19, while projecting in the opposite direction from the supported end of arm 18 is crank or elbow 20 to which is connected the mechanism for turning the arm horizontally, as will presently be described.

Rising from arm 19, Figs. 12 and 13, are the vertical posts 22 and 23, and spaced upwardly from arm 19 and supported by these posts is arm 24. This arm 24 projects outwardly beyond the extremity of arm 19 and carries the suction and blowing head 25. Post 22 provides a support for the two-part blank mold 26 and also comprises a similar support for the two-part neck mold 27, the latter registering with and connecting head 25 and blank mold 26, Figs. 13 and 14. The link mechanism 28 for opening and closing the blank mold 26 is connected to one arm of the bell-crank 29, Figs. 13 and 17, with the other arm of said crank connected to operating rod 30. A rod 31 for opening and closing the neck mold 27 is similarly connected by bell-crank lever 32 and link mechanism 33 to the blank mold. See Figs. 13 and 16. The mechanisms for operating rods 30 and 31 as required for opening and closing the blank and neck molds will presently be described. It is sufficient to here note that these molds are closed together and in register with suction head 25, Fig. 14, when the mold is being filled, as in Fig. 3.

Head 25 is formed with the central bore or cavity 35, and surrounding the same is the ring-like chamber 36 which communicates with longitudinal port 37 in arm 24, Figs. 12, 13, 19 and 20, a pipe 38 flexible for a portion of its length, extending from the inner end of port 37 to hub 14 on wheel 9, Fig. 2, the latter forming a valve casing or chamber, as will presently be described. Neck mold 27 closes around the bottom projecting portion of head 25, Figs. 3 and 14, and the head-embracing cavity in the top of the neck mold is provided with perforated bottom plate 39, the perforations of which register with the bottom of chamber 36. There is an appreciable space 40, Fig. 14, in the neck mold beneath plate 39 which communicates with the blank-forming cavity 41, thus establishing communication between the latter and suction chamber 36.

Operative in bore 36 of head 25 is the vertically movable stem 42 which carries the depending plug-like plunger 43. When the glass is being drawn into the blank mold, stem 42 and its plunger are in lowered position as in Fig. 3, and in dotted lines in Fig. 14, with the shoulder 44 at the juncture of stem 42 and plug 43 in position to form the top edge or mouth of the bottle neck, the shoulder being rounded as shown to shape said edge. When stem 42 is in this lowered position it closes port 45 through which air is admitted for the subsequent blowing operation from pipe 46 extending inwardly to the center of the machine where it is provided with spring valve 47 for controlling the flow of air, the pipe being flexible for a portion of its length to compensate for the movement of arm 18 as will be understood. The supply of air for blowing and the means for operating valve 47 will be presently described.

The plug-carrying stem 42 is raised and lowered by arm 48 and rocking stem 49, motion being transmitted to the latter through lever 50 and rock shaft 51, and the latter being connected to rod 52 extending backwardly over arm 18, with the inner portion 53 of the rod flattened and slotted to move on guide bolts 54, all as shown in Figs. 9, 12 and 18. A roller 55 depending from the inner extremity of rod 53 moves in cam groove 46 of plate 57 secured to oscillating support 15, Figs. 9 and 18. The curvature of groove 56 is such that when the blank mold carrying mechanism is turned outwardly for filling the mold, as in the upper portion of Fig. 1, rod 53 is retracted or moved backward over arm 18, and the movement thus communicated to stem 42 lowers the latter as in Fig. 3, and in dotted lines in Fig. 14, in position to form the top edge or lip of the bottle during the mold charging or filling operation. But when the mold supporting mechanism is turned inwardly on bearing 17 and oscillating support 15 for the purpose of delivering a blank to the blow mold on carrier 9 the position of arm 18 is as shown in Fig. 9, which results in moving outwardly rod 53, thus raising stem 42 to the full line position of Fig. 14.

I will now describe the mechanisms for operating rods 30 and 31, for opening and closing blank mold 26 and blow mold 27, respectively. Referring to Fig. 18, 60 is a tubular stem rotatable in hub 17' of bearing 17 and oscillating support 15. A crank arm 61 on the upper end of shaft 60 is connected to the inner end of the blank mold operating rod 30, while crank arm 62 at the lower end of shaft 60 is turned downwardly as shown, and carries roller 63 which travels in a continuous cam groove 210 in the top surface of the fixed ring-like plate 12. Extending through tubular stem 60 is stem 64 having crank 65 at its upper end connected to the neck mold operating rod 31, and at the lower end of stem 64 is crank 66 which extends downwardly and carries roller 67 which travels in groove 220 of plate 12. Offsets or irregularities in grooves 210 and 220 operate to turn the respective mechanisms at the proper moments for opening and closing the molds as carrier 9 moves over the fixed plate 12.

The mechanism for oscillating the trunnioned support 15 will now be described, reference being had to Figs. 3 to 9, inclusive, and Fig. 18. Projecting upwardly from carrier 9 at opposite sides of the recess therein in which support 15 is mounted are the prong-like arms 70, and located above the latter are similar arms 71 which project outwardly from support 15. Slidable on the under side of support 15 is latch 72, with the bent arms 73 thereof normally lying between arms 70 and 71 and holding support 15 in horizontal position, as in Figs. 4, 5, 6 and 7, and with the mold sustaining arm 18 raised from the inclined mold-filling position shown in Fig. 3. The latch is moved outwardly to displace arms 73 from between arms 70 and 71, as in Fig. 3, and in the upper lefthand portion of Fig. 1, by means of the short lever 74 pivoted at its upper end to the latch, and at its lower end carrying roller 75 which travels on the inner periphery of the ring-like plate 12. A spring 76 opposes outward movement of latch 72, and a similar spring 77 connected to tail-piece 15' of support 15, opposes tipping of the latter. But when roller 75 encounters bump 213, the only irregularity in its path, the latch is projected, whereupon support 15 rocks on its trunnions until arms 71 engage arms 70, thereby tipping the blank mold as in Fig. 3, and projecting its open lower end downwardly to the surface of the molten glass. The latch is thus released at the moment it is desired to start the mold filling or charging operation, this being immediately after the blank mold has entered the furnace, Fig. 1. When the latch is thus released the weight of the projecting mechanism is supported primarily by roller 78 on the under side of arm 18, Figs. 3 and 18, this roller traveling on the horizontally short track 79, formed with the intermediate depressed portion 80 for permitting the mold supporting arm to lower as in Fig. 3. By the time the roller traverses depressed track portion 80 the mold has been filled and the ascent of the roller to the higher portion 81 of the track again raises the mold supporting mechanism and returns support 15 to horizontal position. And as in the mean time roller 75 has passed bump 213, latch 72 responds to the pull of spring 76 and latch arms 73 are again positioned between arms 70 and 71, and the mold supporting mechanism is again locked in its normal or raised position and so remains during the greater part of the revolution of carrier 9.

I will next describe the mechanism for turning the mold supporting arm 18 horizontally on bearing 17 of the oscillating support 15, reference being had particularly to Figs. 1, 8, 9 and 12. Crank arm 20 projecting laterally from the rear end of arm 18 is pivotally connected by strap 86 to the rear end of bar 87 movable in slideway 88 which is secured to the under side of carrier 9 at 89, Fig. 1. Bar 87 is confined in the slideway by plate 90, Fig. 9, and at the outer end of the bar is roller 91 which travels in the continuous cam groove 200 of plate 12. With the arm swinging connection extending to the rear end of bar 87, and with arm 85 of the oscillating mold supporting mechanism turned nearly into line with trunnions 16 as in Fig. 12, and in the upper lefthand portion of Fig. 1, said arm is so near the center of oscillation of support 15 that the movement of said arm when support 15 oscillates is so slight relatively to the fixed guide 88 that there is no appreciable cramping or distorting of the parts. And in this connection it may be stated that the mold operating rollers 63 and 67 also have sufficient play within their respective cam grooves to compensate for the oscillation of support 15, such movement being slight owing to the close proximity of bearing 17 to the axial line of trunnions 16.

A sectional blow mold 95 is mounted on the carrier in the path of movement of the blank and neck molds, Figs. 1 and 2, when the latter are swung inward by the horizontal movement of the mold supporting mechanism due to the travel of roller 91 in cam groove 200. A slide 96 is operatively connected to the blow mold sections, and a roller 97 depending from this slide travels in groove 150 of cam plate 10 secured to frame 5. This groove has two concentric portions 151 and 152, and when roller 97 is traversing the smaller portion 151 the slide is drawn inward and the blow mold held in open position, as at the upper and right-hand portion of Fig. 1, and at the right-hand of Fig. 2.

The seat 98 on which the blow mold opens and closes is formed with a central opening for the vertically movable mold bottom 99, the latter being supported by the outer end of lever 100, Fig. 2, which is fulcrumed between its ends to the carrier support upright 11, with its inner end provided with roller 101 which traverses the cam surface 102 on the under face of plate 10.

The connections for maintaining the mold-filling suction, for blowing the blanks, and for emitting air for cooling the molds, are all incorporated in a head 110 which is secured to fixed frame 5 and around which carrier 9 and its hub portion 38 rotate. The suction created in pipe 38 when the apparatus is in mold charging position is induced through port 111 in head 110, Figs. 10 and 11, which at such time is in register with the then active suction pipe 38, and with the other pipes 38 blanked, port 111 being in communication with pipe 112 connected to a vacuum pump or a like apparatus, not shown.

The air for blowing the blank is communicated through pipe 113 to annular port 114 in the upper portion of head 110 and with pipes 46 radiating from the casing 115 inclosing and rotatable over the upper ported portion of head 110. Each valve 47 is provided with the spring-carrying roller-stem 116 which tends normally to hold the valve closed, this stem riding on plate 117 secured to head 110, and raised for a suitable distance at 118, Figs. 8 and 10, to open the valve at the proper time during the rotating movement of carrier 9 to pass air for the blowing operation. Head 110 is provided with a relatively large port 120 supplied with compressed air through pipe 121, and radiating from casing 38 in the plane of the upper encircling portion of port 120 are pipes 122, Figs. 1, 2 and 10, for discharging air on the mold, being designed particularly for cooling the blow molds.

The operation is as follows: With carrier 9 rotating in the direction of the arrow, Fig. 1, the blank mold supporting mechanism is in outwardly projected position for entering the slotted boot B of furnace A, as at such time roller 91, which controls the projection of such mechanism, is traversing the smaller concentric portion 201 of groove 200. As the mechanism advances the latch mechanism for oscillating support 15 encounters bump 213 and the projecting mechanism is lowered as in Fig. 3, and it is at this time that communication is established with suction pipe 38, as shown in Fig. 11, and the registering blow and neck molds are filled with molten glass, the glass forming around the then depressed plug 43, Fig. 14, and completely shaping the neck portion of the blank and at the same time the plug forms the neck cavity which provides the start for the blowing operation. The supporting mechanism is then raised to normal position as described by roller 78 moving to the higher portion of track 81, and immediately roller 91 enters the relatively short outward offset 202 of groove 200, which results in so swinging arm 18 as to move the blank mold over knife bar 125, which latter severs the molten glass drawn up from the bath and hanging from the mold, and during the traverse of offset 202 the mold remains in position over the knife bar and provides a momentary support for the glass within the open bottom mold, and by thus briefly supporting the molten glass from beneath it has an opportunity to set within the mold and precludes dripping when the mold is moved inward toward carrier 9. Roller 91 moves from offset 202 into the larger concentric portion 203 of the groove, and this results in centering the glass blank on seat 98 immediately above mold bottom 99, the latter being raised into blank supporting position by the action of cam face 102 on lever 100, as shown at the right-hand side of Fig. 2. Almost immediately after the blank is thus centered on seat 98, roller 63 enters the outward offset 211 in groove 210 and the blank mold 26 is opened, as in the upper righthand portion of Fig. 1, leaving the blank suspended from the neck mold, as in Fig. 2. This movement having been accomplished, and with the blank mold open and out of the way, the blow mold operating roller 97 enters the larger concentric portion 152 of cam groove 150 which results in closing the blow mold around the blank and in accurate register with the blank supporting neck mold. In the meantime the plug-carrying stem 42 has been raised by the described movement of rod 53, effected by cam groove 66 upon the inward swinging of arm 180 as described, and port 45, Fig. 14, is open for the passage of air to the blank as soon as valve 47 is opened. The several parts remain in blowing relation until the neck mold operating roller 67 encounters the outward offset 221, Fig. 8, the only irregularity in groove 220. The resulting momentary opening of the neck mold 27 occurs coincidentally with the passage of the arm swinging roller 91 from the larger portion 203 of its groove into the beginning of the smaller portion 201 of said groove, as indicated at 204, Fig. 8, with the result that the then open and released blank and neck molds swing outwardly and entirely clear of the blank before the neck mold closes, which occurs when roller 67 has fully passed offset 221. Following this closing of the neck mold the blow mold is closed into register with it by the passage of the blow mold operating roller 63 from the larger portion 211 of its groove into the beginning of the contracted smaller portion 210, as indicated at 212, Fig. 8, when the blank and neck molds are in proper position for the next charging or filling operation. After the blank has been fully relieved of the neck mold as described, it is released from the blow mold by operating roller 97 of the latter entering the smaller portion 151 of its groove and leaving the blown bottle free to be removed from carrier 9. It will be understood that cam face 102 is of such length as to hold the mold bottom 99 elevated during the required period, such cam face disappearing in the bottom surface of plate 10 when the mold bottom is no longer required to be in elevated position. It will also be understood that cam face 118 for opening the blowing valve 47 is of such length as to hold the valve open as required and to close it at the completion of the blowing operation.

From the foregoing description it will be seen that carrier 9 moves continuously and that the several operations are effected through the medium of suitable mechanisms mounted on and movable with the carrier and operated by fixed devices surfaced to perform the various operations.

I claim:—

1. The combination of a horizontally movable carrier, an open bottom blank mold, suction means coöperating with the mold, and a support for the mold mounted to oscillate on the carrier on a horizontal axis.

2. The combination of a horizontally movable carrier, an open bottom blank mold supported by the carrier and movable vertically relatively thereto, suction means coöperating with the mold, and means made operative by the horizontal movement of the carrier for moving the mold vertically.

3. The combination of a horizontally movable carrier, an open bottom blank mold, suction means coöperating with the mold, supporting means for the mold mounted on the carrier to oscillate on a horizontal axis, and means made operative by the horizontal movement of the carrier for oscillating said support.

4. The combination of a horizontally movable carrier, a support mounted on and movable vertically relatively to the carrier, an arm mounted to rotate on the support with the axis of rotation disposed vertically, an open bottom blank mold moved by the free portion of the arm relatively to the carrier, suction means coöperating with the blank mold, a blow mold mounted on the carrier, and blowing means.

5. The combination of a horizontally movable carrier, a blank mold operative in different horizontal planes for filling with molten glass and for delivering the molded glass, vertically movable mold supporting means mounted on the carrier, and means actuated by the advancing movement of the horizontal carrier for moving the supporting means vertically.

6. The combination of a horizontally movable carrier, a blank mold operative in different horizontal planes for filling with molten glass and for delivering the molded glass, mold supporting means mounted on the carrier to move both vertically and horizontally, and a blow mold to which the blank mold is caused to deliver the glass by the horizontal movement of the supporting means.

7. The combination of a horizontally movable carrier, a blank mold operative in different horizontal planes for filling with molten glass and for delivering the molded glass, a blow mold mounted on the carrier and to which the molded glass is delivered by the horizontal movement of the mold supporting means, and mechanism operated by the advancing movement of the carrier for moving the said supporting means both vertically and horizontally.

8. The combination of a horizontally movable carrier, a blank mold operative in different horizontal planes for filling with molten glass and for delivering the molded glass, and mold supporting means mounted to oscillate on the carrier with its axis disposed horizontally.

9. The combination of a horizontally movable carrier, a blank mold operative in different horizontal planes for filling with molten glass and for delivering the molded glass, mold supporting means mounted to oscillate on the carrier with its axis of oscillation disposed horizontally, the blank mold mounted to move horizontally relatively to the oscillating supporting means, and a blow mold mounted on the carrier and to which the glass is delivered by said horizontal movement of the blank mold relatively to the supporting means.

10. The combination of a horizontally movable carrier, mold supporting means movable with the carrier and mounted to move vertically and horizontally relatively thereto, coöperating blank and neck molds carried by the supporting means, suction means for drawing molten glass into the molds when the latter are held in lowered position by the supporting means, and a blow mold mounted on the carrier and to which the molded glass is delivered by the horizontal movement of the mold supporting means relatively to the carrier.

11. The combination of a horizontally movable carrier, mold supporting means mounted to oscillate vertically on the carrier, means made operative by the advancing movement of the carrier for oscillating the supporting means, the supporting means having a part which moves horizontally, a blank mold and a neck mold and blowing means mounted on said horizontally moving part, and a blow mold mounted on the carrier and to which the glass is delivered by said horizontally moving part of the mold support.

12. The combination of a horizontally movable carrier, an arm sustained by the carrier and movable horizontally relatively thereto, an open bottom blank mold supported by the arm, suction means coöperating with the blank mold for drawing molten glass thereinto, forming mechanism on the carrier to which the molded glass is delivered by the horizontal movement of the arm, and means for moving the mold supporting portion of the arm vertically for moving the blank mold toward and from the surface of molten glass.

13. The combination of a horizontally movable carrier, an arm supported by the carrier and mounted to move horizontally relatively thereto, an open bottom blank mold supported by the arm, suction mechanism coöperating with the mold, forming mechanism on the carrier to which the molten glass is delivered by the horizontal movement of said arm, and a mounting on the carrier for the arm on which the latter oscillates on a horizontal axis for raising and lowering the mold relatively to the surface of molten glass.

14. The combination of a horizontally movable carrier, a blank mold support mounted on the carrier to move both vertically and horizontally relatively thereto, an open bottom blank mold mounted on the support, suction means for the mold, means made operative by the advancing movement of the carrier for raising and lowering the mold support, means made operative by the movement of the carrier for moving the support horizontally relatively to the carrier, and a blow mold on the carrier and to which the glass is delivered by the horizontal movement of the blank mold.

15. The combination of a horizontally movable carrier, an open bottom blank mold movable with the carrier, suction means for the mold, means for raising and lowering the mold relatively to the carrier, a blow mold on the carrier, and mechanism for moving the blank mold horizontally relatively to the carrier for delivering the glass to the blow mold.

16. The combination of a rotatable carrier, blank forming mechanism consisting of sectional coöperating blank and neck molds, a support for the forming mechanism movable with the carrier and mounted to move vertically and horizontally relatively thereto, a sectional blow mold on the carrier and within the range of horizontal movement of the forming mechanism, blow mold operating mechanism, means operative during a portion of the rotation of the carrier for moving the blank forming mechanism vertically, means operative during another portion of the movement of the carrier for moving said forming mechanism horizontally toward the blow mold and for subsequently returning the blank forming mechanism from said position, means for opening and closing the blank mold, and means for opening and closing the neck mold.

17. The combination of a horizontally rotatable carrier, forming mechanism on the carrier and movable horizontally to and from projecting position relatively thereto, means operative when the blank forming mechanism is in projected position for moving the forming mechanism vertically relatively to the carrier, the forming mechanism consisting of sectional coöperating blank and neck molds together with suction means, a sectional blow mold on the carrier to which the glass is delivered by the horizontal movement of the blank forming mechanism, devices for moving the blank forming mechanism vertically, devices for moving the blank forming mechanism horizontally, separate devices for each of the molds for opening and closing the same, and fixed devices adjacent the rotatable carrier engaged by and operating the said several devices as described as the latter are moved by the carrier.

18. The combination of a horizontally movable carrier, coöperating blank forming and suction means, a support for the blank forming and suction means mounted to oscillate on the carrier with its axis disposed horizontally, a latch device normally holding the support in raised position, a fixed device past which the carrier moves for releasing the latch, fixed means past which the lowered support moves for raising it to normal position, and means for restoring the latch to support-holding position after the support has been thus raised.

19. The combination of a horizontally rotatable carrier, three continuous fixed guides beneath the carrier and each formed with irregularities, blank forming mechanism consisting of sectional coöperating blank and neck molds and suction means, a support for the blank forming mechanism mounted on and movable horizontally relatively to the carrier, a blow mold to which the blank is delivered by such horizontal movement, means engaging one of the said fixed guides and operated by the irregularities thereof for moving the forming mechanism horizontally, means engaging another of said fixed guides and operated by the irregularities thereof for opening and closing the blank mold, means engaging the third of said fixed guides and operated by the irregularities thereof for opening and closing the neck mold, the blank forming mechanism mounted to move vertically on the carrier, and devices for effecting said movement preceding the blank-delivering movement of the blank forming mechanism.

20. The combination of a horizontally movable blow mold carrier, a sectional open bottom blow mold mounted thereon, similarly formed coöperating blank and neck molds movable with the carrier, a vertically movable mold bottom on the carrier and coöperating interchangeably with the blow and blank molds, means for moving the blank mold to and from operative position relatively to the neck mold and the mold bottom, means for moving the blow mold to and from position relatively to the neck mold and mold bottom, suction means coöperating with the neck and blank molds when the latter are in register, and blowing means operative when the neck and blow molds are in register.

21. In a machine of the character described, the combination of a vertically movable blank mold operative in different horizontal planes for filling with molten glass and for delivering the molded glass, supporting means for said mold movable both vertically and horizontally, and a blow mold to which the blank mold is caused to deliver the glass by the horizontal movement of said supporting means.

22. In a machine of the character described, the combination of an open bottom blank-forming mechanism, supporting means for said mechanism movable both vertically and horizontally for lowering and raising the mechanism within a furnace and for moving it laterally therein, and a knife bar positioned at one side of the mechanism and in the plane of the bottom thereof when said mechanism is raised and adapted to sever the hanging glass when the mold mechanism is moved horizontally thereover within the furnace.

23. The combination of a neck mold, a blank mold and a blow mold registering successively with the neck mold, and a mold bottom coöperating with the blank and blow molds interchangeably and supporting the lower end of the blank while the blank and blow molds are out of register with the neck mold.

24. The combination of a neck mold, a blank mold and a blow mold registering successively with the neck mold, a vertically movable mold bottom coöperating with the blank and blow molds interchangeably and supporting the lower end of the blank while the blank and blow molds are out of register with the neck mold, and mechanism for raising and lowering the mold bottom.

25. The combination of a horizontally movable carrier, an open bottom mold, suction means coöperating with the mold, a glass furnace having a passageway traversed by the mold as the latter is moved by the carrier, vertically movable supporting means on the carrier for said mold, and fixed means engaged by the supporting means as the carrier moves horizontally for lowering and raising the mold.

26. The combination of a horizontally movable carrier, an open bottom blank mold, a neck mold coöperating with the blank mold, suction means with which the neck mold coöperates, a support movable vertically on the carrier for said molds and suction means, a glass furnace having a horizontal passageway through which said molds are moved by the horizontal travel of the carrier, mechanism for lowering and raising the molds while within the furnace, and fixed means past which the carrier moves for operating said lowering and raising mechanism.

27. The combination of a horizontally movable carrier, a support mounted to move horizontally on the carrier, open bottom blank forming mechanism mounted on the support, a glass furnace having a horizontal passageway traversed by the blank forming mechanism, means for lowering and raising said support while the forming mechanism is within the furnace, a knife bar projecting from the carrier in the plane of the lower extremity of the forming mechanism when the latter is in raised position, means for turning said support horizontally while within the furnace for placing the forming mechanism over the knife bar, means for imparting still further horizontal movement to said support, and a blow mold to which said forming mechanism is caused to deliver the glass by such further movement of said support.

28. The combination of a horizontally movable carrier, a support mounted on the carrier and movable thereon, open bottom blank forming mechanism mounted on the support, a knife bar rigid with and projecting from the carrier, a furnace having a passageway through which the forming mechanism and the knife bar are moved by the carrier, means operative while the forming mechanism is within the furnace for lowering and raising said mechanism, and means operative while the knife bar and the forming mechanism are within the furnace for moving the latter over the knife bar.

29. The combination of a horizontally movable carrier, sectional blank forming mechanism movably mounted on the carrier, a sectional blow mold mounted on the carrier, devices projecting from the carrier for operating the forming mechanism and for moving it relatively to the blow mold, a device projecting from the carrier for operating the blow mold, and fixed parts traversed by said projecting devices as the carrier rotates with said fixed parts shaped to actuate said devices for performing the several operations in sequence, as described.

30. The combination of a suction head having a central bore for registering with a neck mold, the head also formed with a chamber at one side of the bore with the chamber open through the bottom face of the head, a plug carrying stem movable in the head bore, a suction tube in communication with said chamber, and a neck mold adapted at its top face to register with the under face of said head.

31. The combination of an open bottom blank mold, a neck mold registering therewith, a suction head registering with the neck mold, said head having a bore in line with the mold cavities and also formed with a chamber encircling the bore with the bottom of the chamber in communication with the upper end of the neck mold cavity, said chamber adapted to communicate with suction means, a stem movable in the head bore, and a plug projecting from the stem and adapted to be extended into the cavities of said molds.

32. The combination of a neck mold, a plate fitted to the top surface of the mold with a space intervening between the plate and mold, the plate formed with a central plug passage and with perforations surrounding the passage which are open to said intervening space, a suction head having its bottom registering with the top of the neck mold with the head formed with a chamber which is open to said plate perforations, a suction pipe connected to said chamber, the head having a bore in line with the mold cavity, and a plug-carrying stem movable in the bore.

33. The combination of a neck mold, a sectional blank mold, means for moving the blank mold into and out of register with the neck mold, a plunger and means for projecting the same into the neck mold while said molds are in register, means for opening the blank mold before it moves away from the neck mold, a sectional blow mold and means for closing it in register with the neck mold after the blank mold moves away from the latter, and blowing means operative while the blowing and neck molds are in register.

34. The combination of a vertically movable mold bottom, a sectional open-bottom blank mold, means for moving the blank mold into and out of operative position with relation to the mold bottom, a sectional open-bottom blow mold, means for moving the blow mold with relation to the mold bottom, and means for raising and lowering the mold bottom with relation to said mold.

35. The combination of a horizontally movable carrier, a mold bottom traveling with the carrier and movable vertically, means for moving the mold bottom, a sectional open-bottom blank mold and a similarly formed blow mold—both moving with the carrier and with which the mold bottom coöperates interchangeably, means for operating the blank mold, and means for operating the blow mold.

36. The combination of a rotatable carrier, a support movably mounted on the carrier, fixed means traversed by the support for holding it extended outwardly from the carrier and for turning it inwardly thereon, a sectional open-bottom blank mold carried by the support and positioned thereby over molten glass when the support is extended outward, means for withdrawing air from the blank mold while thus positioned for inducing a flow of glass upwardly thereinto, blank forming and holding means with which the blank mold is moved into register when the said support moves inward on the carrier, and means operating while the blank mold is thus positioned and opening the same and releasing the blank.

37. The combination of a rotatable carrier, a support pivoted to oscillate thereon, a fixed member having a continuous groove, a portion of said groove being concentric with the carrier and offsets formed in the groove for oscillating said support on the carrier, a projection on the support extending into the groove, a sectional open-bottom blank mold on the support adapted to be positioned by the latter over molten glass, means for withdrawing air from the blank mold while thus positioned, blank forming and holding mechanism on the carrier, the offset in the groove operating to turn the support and place the blank mold in register with said forming and holding mechanism, a second continuous groove having a portion concentric with the carrier and provided with an offset, and mechanism for opening and closing the blank mold having a projection traveling in said second groove.

38. In a machine of the character described, the combination with a rotatable carrier, and a fixed member having two continuous grooves each provided with offsets, of a support pivoted to oscillate on the carrier with a projection on the support traveling in one of the grooves, the offset in that groove operating to oscillate the support inwardly and outwardly on the carrier, a sectional blank mold mounted on the support, and mechanism for opening and closing the blank mold provided with a projection which travels in the other of said grooves and which is operated by the offset in that groove for opening and closing the blank mold.

39. The combination of a horizontally movable carrier, a support pivoted to oscillate on the carrier, a sectional blank mold mounted on the support, the support operating when turned outward to position the mold for receiving molten glass and when turned inward delivering the glass to forming mechanism, mechanism for opening and closing the blank mold, and a fixed device engaging said mechanism when the arm is turned inward for operating said mechanism to open the mold and deliver the glass.

40. The combination of a horizontally movable carrier, a support pivoted to oscillate thereon, a blank mold mounted on the support and positioned by the latter when turned outward to receive molten glass, the mold being adapted when the support is turned inward to deliver the glass to forming mechanism, a crank carried by the support and operatively connected to the mold for opening and closing the latter, a projection on the crank and a fixed surface traversed by the projection, a portion of said surface being concentric with the carrier, and an offset in the surface for turning the crank and opening the mold.

In testimony whereof I affix my signature in presence of two witnesses.

ALVIN S. REICHEL.

Witnesses:
A. E. DILLINEN,
M. LEE TITUS.